United States Patent Office.

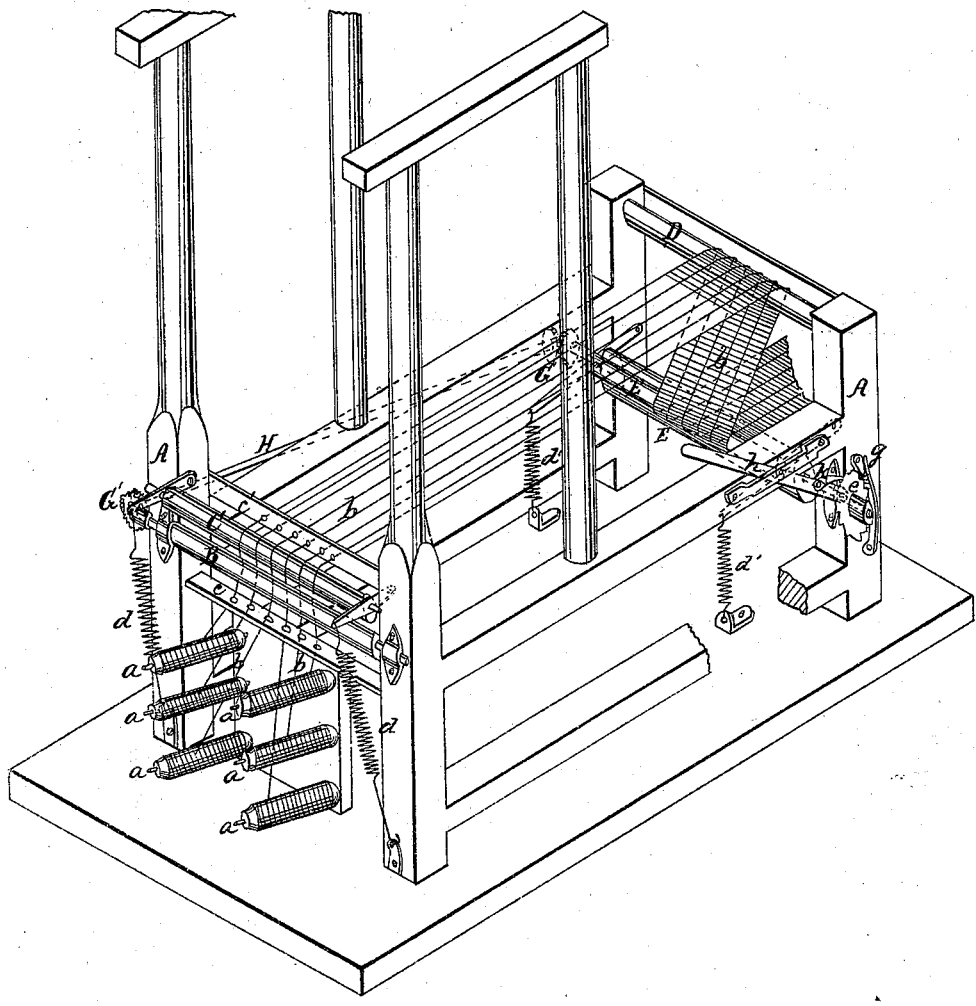

FRANK PAINTER, OF EAST HAMPTON, MASSACHUSETTS.

Letters Patent No. 70,253, dated October 29, 1867.

IMPROVEMENT IN TENSION-REGULATOR FOR LOOMS.

*The Schedule referred to in these Letters Patent and making part of the same.*

TO ALL WHOM IT MAY CONCERN:

Be it known that I, F. PAINTER, of East Hampton, in the county of Hampshire, and State of Massachusetts, have invented a new and improved Mode of Regulating a Positive Tension of Rubber Threads in Elastic-Fabric Looms; and I do hereby declare that the following is a full, clear, and exact description thereof, which will enable others skilled in the art to make and use the same, reference being had to the accompanying drawing, forming part of this specification.

The drawing represents a loom having my improved tension-adjustment attached

This invention relates to a new and useful improvement in looms for weaving elastic fabrics of vulcanized rubber threads, and consists in an arrangement of mechanical devices for stretching the rubber threads, and holding them at a certain positive degree of tension while the fabric is woven, as hereinafter more particularly described.

This mechanism is applicable to looms for weaving all kinds of elastic rubber goods, but the drawing illustrates only my invention as applied to a loom.

A A represent the framing of a loom, at one end of which are placed, as usual, the spools $a\ a$, which carry the rubber threads $b\ b$, the number and position of which depend on the number of webs and nature of the fabric to be woven. Over the spools $a\ a$ is hung a feed-roll, B, which receives rubber threads from a threading and guide-plate, $c$, through holes in which the threads pass in coming from the spools. And by the side of the feed-roll B is hung a tension-roll, C, that is borne against the feed-roll B to press upon the rubber threads $b\ b$ as they pass between the two rolls into the loom to form the web to be woven, by the spiral springs $d\ d$. The threads pass also through a threading and guide-plate, $c'$, after leaving the tension-roll C, passing from thence to a friction-roll, D, at the other end of the loom, over which roll they pass down to the take-up shaft E under a tension-roll, F, that bears the rubber threads against the shaft by means of spiral springs $d'\ d'$. The take-up shaft E is actuated by the bevel-gear G at one end, connected by the shaft H with the feed-roll B, by the bevel-gear $G'$, to be operated thereby. The gear G is made to run the take-up shaft E at a higher speed than the feed-roll B, in any required proportion to give the desired tension to the rubber threads $b\ b$, and a change of gear may be made at any time to adjust the motion of the take-up shaft to suit fabrics of different degrees of elasticity. The feed and tension-rollers are to be covered with rubber or any other suitable material for retaining their hold on the threads firmly. On the end of the take-up shaft E, opposite the gear G, is placed a ratchet-wheel, $e$, provided with a spring-dog, $g$, to hold the take-up, as usual, and a lever, $h$, is pivoted to the frame, carrying a pawl, $k$, to turn the ratchet and the take-up shaft for threading and adjusting the rubber warp before working the loom by power.

It will be apparent that the rubber threads are stretched and held positively to any degree of tension required by means of my improved gear connection between the feed-roll and the take-up shaft, while the web is woven so as to produce fabrics of any desired degree of elasticity.

Having described my invention, I claim as new, and desire to secure by Letters Patent—

In looms for weaving elastic fabric, the construction and arrangement of the feed-roll B, receiving the rubber threads from the threading and guide-plates $c\ c'$, the adjustable tension-roll C, bearing against the feed-roll B, and clamping the threads by means of the spiral springs $d\ d$, the friction-roll D, take-up shaft E, under the adjustable tension-roll F, that bears the rubber threads against said shaft by means of the spiral springs $d'\ d'$, all operating as described, whereby the rubber threads are stretched and held positively to any degree of tension while the web is being woven to produce fabrics of any desired elasticity, as herein shown and described.

FRANK PAINTER.

Witnesses:
GEO. S. CLARK,
HUGO OBEREMPT.